United States Patent
Nakagawa (10) Patent No.: US 9,559,751 B2
(45) Date of Patent: Jan. 31, 2017

(54) COMMUNICATION SYSTEM, TRANSMISSION APPARATUS, LINE CONTROL APPARATUS, LINE STATE MONITORING METHOD AND NON-TRANSITORY COMPUTER READABLE MEDIUM STORING PROGRAM

(71) Applicant: Koichi Nakagawa, Tokyo (JP)

(72) Inventor: Koichi Nakagawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 139 days.

(21) Appl. No.: 14/379,736

(22) PCT Filed: Nov. 20, 2012

(86) PCT No.: PCT/JP2012/007424
§ 371 (c)(1),
(2) Date: Aug. 19, 2014

(87) PCT Pub. No.: WO2013/145048
PCT Pub. Date: Oct. 3, 2013

(65) Prior Publication Data
US 2015/0023182 A1 Jan. 22, 2015

(30) Foreign Application Priority Data
Mar. 27, 2012 (JP) ................. 2012-070785

(51) Int. Cl.
*H04J 3/22* (2006.01)
*H04B 3/46* (2015.01)
(Continued)

(52) U.S. Cl.
CPC ........... *H04B 3/46* (2013.01); *H04M 1/72522* (2013.01); *H04W 24/04* (2013.01); *H04W 24/08* (2013.01)

(58) Field of Classification Search
None
See application file for complete search history.

(56) References Cited

U.S. PATENT DOCUMENTS 7,480,260 B1    1/2009  Vashisht et al.
7,991,400 B2    8/2011  Ito et al.
                (Continued)

FOREIGN PATENT DOCUMENTS

EP    0 719 067 A2    6/1996
EP    0 719 067 A3    3/1999
                (Continued)

OTHER PUBLICATIONS

Extended European Search Report dated Oct. 19, 2015.
(Continued)

*Primary Examiner* — Kwang B Yao
*Assistant Examiner* — Juvena Loo
(74) *Attorney, Agent, or Firm* — McGinn IP Law Group, PLLC.

(57) ABSTRACT

A communication system includes a radio transmission apparatus that terminates a radio communication line, a radio transmission apparatus that terminates a radio communication line, and a line control apparatus that performs data communication with the radio transmission apparatuses. The radio transmission apparatuses and monitor the line states of the radio communication lines and notify the line control apparatus of the line states. The line control apparatus controls data to be output to the radio transmission apparatuses and according to the line states.

15 Claims, 8 Drawing Sheets

(51) Int. Cl.
*H04M 1/725* (2006.01)
*H04W 24/04* (2009.01)
*H04W 24/08* (2009.01)

(56) References Cited

U.S. PATENT DOCUMENTS

| | | | |
|---|---|---|---|
| 2004/0184482 A1* | 9/2004 | Gronberg | H04L 1/0009 370/477 |
| 2005/0286410 A1* | 12/2005 | Truong | H04L 1/0002 370/216 |
| 2008/0013558 A1 | 1/2008 | Ito et al. | |
| 2008/0049672 A1* | 2/2008 | Barak | H04L 5/0023 370/330 |
| 2008/0219184 A1* | 9/2008 | Fowler | H04L 43/0811 370/254 |
| 2011/0116443 A1* | 5/2011 | Yu | H04L 12/413 370/328 |
| 2013/0059529 A1 | 3/2013 | Sonobe et al. | |

FOREIGN PATENT DOCUMENTS

| | | | |
|---|---|---|---|
| EP | 1 241 901 A1 | 9/2002 | |
| EP | 1241901 A1 * | 9/2002 | ........... H04L 1/0009 |
| JP | 4-144428 A | 5/1992 | |
| JP | 2003-60647 A | 2/2003 | |
| JP | 2008-22089 A | 1/2008 | |
| JP | 2009-130759 A | 6/2009 | |
| JP | 2011-151587 A | 8/2011 | |
| JP | 2011-244225 A | 12/2011 | |
| JP | 2011-244276 A | 12/2011 | |
| WO | WO 2011/118542 A1 | 9/2011 | |

OTHER PUBLICATIONS

International Search Report (ISR) (PCT Form PCT/ISA/210), in PCT/JP2012/007424, dated Jan. 8, 2013.
Japanese Office Action dated Sep. 27, 2016 and an English Translation thereof.

* cited by examiner

COMMUNICATION SYSTEM, TRANSMISSION APPARATUS, LINE CONTROL APPARATUS, LINE STATE MONITORING METHOD AND NON-TRANSITORY COMPUTER READABLE MEDIUM STORING PROGRAM

TECHNICAL FIELD

The present invention relates to a communication system, in particular to a communication system including a line control apparatus that controls a plurality of communication lines.

BACKGROUND ART

In packet transmission networks, networks using radio lines have a small transmission capacity for one radio line. Therefore, there are cases where a plurality of radio lines are bundled up and used as one line in order to secure a proper transmission capacity. In the case where radio lines are bundled up in this way, when the radio line status has changed and hence the transmission band has changed, it is necessary to carry out data distribution and band control in accordance with the radio line status. Note that the bundling of a plurality of radio lines can also be expressed as "bonding radio lines".

Patent literature 1 discloses a configuration of a radio relay apparatus that performs AMR control. The radio relay apparatus disclosed in Patent literature 1 can automatically change the radio modulation method for the wireless section between the radio relay apparatus and the transfer-source radio relay apparatus when the radio modulation method for the wireless section between the radio relay apparatus and the transfer-destination radio relay apparatus is changed by the AMR control.

CITATION LIST

Patent Literature

Japanese Unexamined Patent Application Publication No. 2011-244276

SUMMARY OF INVENTION

Technical Problem

In the case where radio lines are bonded, when the radio line status has changed and hence the transmission band has changed, it is necessary to carry out band control and so on in accordance with the radio line status. Here, there is a problem that when the radio relay apparatus that terminates a radio line(s) is different from the line control apparatus that is connected to a plurality of radio relay apparatuses and bonds a plurality of radio lines, the line control apparatus cannot recognize each of the radio line statuses.

To solve the above-described problem, an object of the present invention is to provide a communication system, a transmission apparatus, a line control apparatus, a line state monitoring method, and a program capable of, even when the radio relay apparatus is different from the line control apparatus, enabling the line control apparatus to recognize the radio line statuses.

Solution to Problem

A communication system according to a first aspect of the present invention includes: a first transmission apparatus that terminates a first communication line; a second transmission apparatus that terminates a second communication line; and a line control apparatus that performs data communication with the first and second transmission apparatuses, in which the first transmission apparatus is configured to monitor a line state of the first communication line and notifies the line control apparatus of the line state by using a first control packet, the line state being set in the first control packet, the second transmission apparatus is configured to monitor a line state of the second communication line and notifies the line control apparatus of the line state by using a second control packet, the line state being set in the second control packet, and the line control apparatus is configured to control data to be output to the first and second transmission apparatuses based on the line state.

A transmission apparatus according to a second aspect of the present invention includes: a line termination unit that terminates a communication line; a line state monitoring unit that monitors a line state of the communication line; a control packet generation unit that generates a control packet, the line state being set in the control packet; and a transmitting unit that transmits the control packet to a line control unit, the line control unit being configured to control data to be output to a plurality of transmission apparatuses.

A line control apparatus according to a third aspect of the present invention includes: a transmitting unit that performs data communication with a first transmission apparatus and a second transmission apparatus, the first transmission apparatus being configured to terminate a first communication line, the second transmission apparatus being configured to terminate a second communication line; and a line control unit that controls data to be output to the first and second transmission apparatuses based on a line state of the first communication line set in a first control packet and a line state of the second communication line set in a second control packet, the first control packet being transmitted from the first transmission apparatus, the second control packet being transmitted from the second transmission apparatus.

A line state monitoring method according to a fourth aspect of the present invention includes: monitoring a line state of a communication line based on data received from the communication line; generating a control packet, the line state being set in the control packet; and transmitting the control packet to a line control apparatus, the line control apparatus being configured to control data to be output to a plurality of transmission apparatuses.

A program according to a fifth aspect of the present invention causes a computer to execute: a step of monitoring a line state of a communication line based on data received from the communication line; a step of generating a control packet, the line state being set in the control packet; and a step of transmitting the control packet to a line control apparatus, the line control apparatus being configured to control data to be output to a plurality of transmission apparatuses.

Advantageous Effects of Invention

According to the present invention, it is possible to provide a communication system, a transmission apparatus, a line control apparatus, a line state monitoring method, and a program capable of, even when the radio relay apparatus is different from the line control apparatus, enabling the line control apparatus to recognize the radio line statuses.

DESCRIPTION OF EMBODIMENTS

First Exemplary Embodiment

Figure 1:
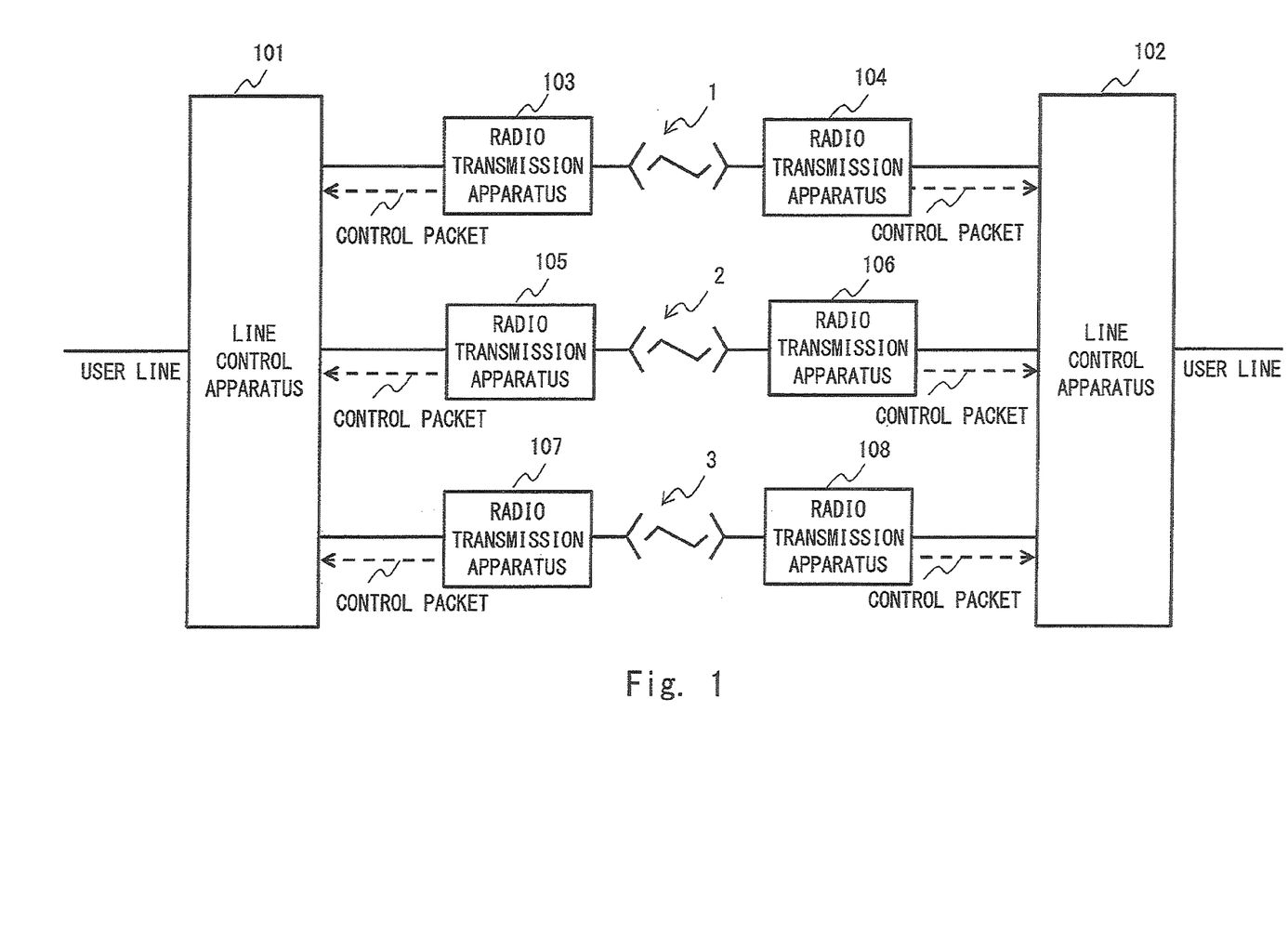
FIG. 1 is a configuration diagram of a communication system according to a first exemplary embodiment.

Exemplary embodiments according to the present invention are explained hereinafter with reference to the drawings. Firstly, a configuration example of a communication system according to a first exemplary embodiment of the present invention is explained with reference to FIG. 1. FIG. 1 shows a configuration example of a communication system that bonds three radio lines for one traffic in order to secure a proper transmission capacity and performs transmission by using the bonded radio lines in a packet transmission network including a radio line.

The communication system includes line control apparatuses 101 and 102, and radio transmission apparatuses 103 to 108. The radio transmission apparatuses 103 and 104 are disposed at both ends of a radio line 1, and they terminate the radio line 1. The radio transmission apparatuses 105 and 106 are disposed at both ends of a radio line 2, and they terminate the radio line 2. The radio transmission apparatuses 107 and 108 are disposed at both ends of a radio line 3, and they terminate the radio line 3.

The radio transmission apparatuses 103 to 108 monitor the line states of the connected radio lines. For example, each radio transmission apparatus monitors a line state such as whether the radio line is disconnected or not or whether the modulation method used for the radio line has been changed or not.

Examples of the modulation method change includes a case where, assuming that the radio transmission apparatuses 103 to 108 are compliant with AMP (Adaptive Modulation Radio) control, the radio line statuses of the radio transmission apparatuses 103 to 108 change due to a weather change or the like. That is, when the quality of the radio line deteriorates, for example, the modulation method is changed in accordance with that change. Further, the radio transmission band is also changed. For example, when 16QAM, 64QAM, 256QAM, and the like are used as a multi-level modulation method, one of these modulation methods may be selected and used according to the radio line status.

Each of the radio transmission apparatuses 103 to 108 monitors the radio line and notifies the line control apparatus 101 or 102 of the line state of the monitored radio line by using a predetermined control packet. For example, the control packet is specified according to the protocol with which information about network topology is sent between neighboring apparatuses. The information about network topology includes, for example, an IP address assigned to a communication apparatus, a port number of a communication apparatus, and so on. Further, the control packet may include a field where an administrator or the like that administers the network can define information to be sent.

The line control apparatuses 101 and 102 control data to be output to their respective radio transmission apparatuses based on the line states sent from the radio transmission apparatuses. For example, the line control apparatus 101 controls data to be output to the radio transmission apparatuses 103, 105 and 107. The line control apparatus 102 controls data to be output to the radio transmission apparatuses 104, 106 and 108. For example, the line control apparatuses 101 and 102 control the amount of data to be output to their respective radio transmission apparatuses. For example, when the radio line 1 is in a disconnected state, the line control apparatus 101 may perform control so that no data is output to the radio transmission apparatus 103 while data is output to the radio transmission apparatuses 105 and 107. Alternatively, the line control apparatus 101 may perform control so that a large amount of data is output to a radio transmission apparatus(s) connected to a radio line(s) having a relatively good line state and a high throughput while a small amount of data is output to a radio transmission apparatus(s) connected to a radio line(s) having a relatively poor line state and a low throughput.

Further, the line control apparatuses 101 and 102 are connected to a user line(s). The user line is a line connected to a network of a telecommunications carrier, a service provider, or the like. The line control apparatuses 101 and 102 transmit/receive user data such as packet data through the user line(s).

As explained above, by using the communication apparatus show in FIG. 1, it is possible to send information about the line state of a radio line(s) from the radio transmission apparatus to the line control apparatus by using a control packet(s). In this way, the line control apparatus can recognize the line state of a radio line(s) even when the radio line(s) is not directly connected to the line control apparatus. That is, even in the case where the line control apparatus is an apparatus different from the radio transmission apparatus, the line control apparatus can recognize the line state of a radio line(s). Further, the line control apparatus can control data to be output to a plurality of radio transmission apparatuses based on the line state of a radio line(s). As a result, it is possible to increase the capacity for data to be communicated and to improve the throughput.

Further, although a configuration example of a network using radio lines is explained in FIG. 1, the network configuration is not limited to this example. For example, the present invention can be applied to a network using wired lines instead of the radio lines 1 to 3.

Figure 2:
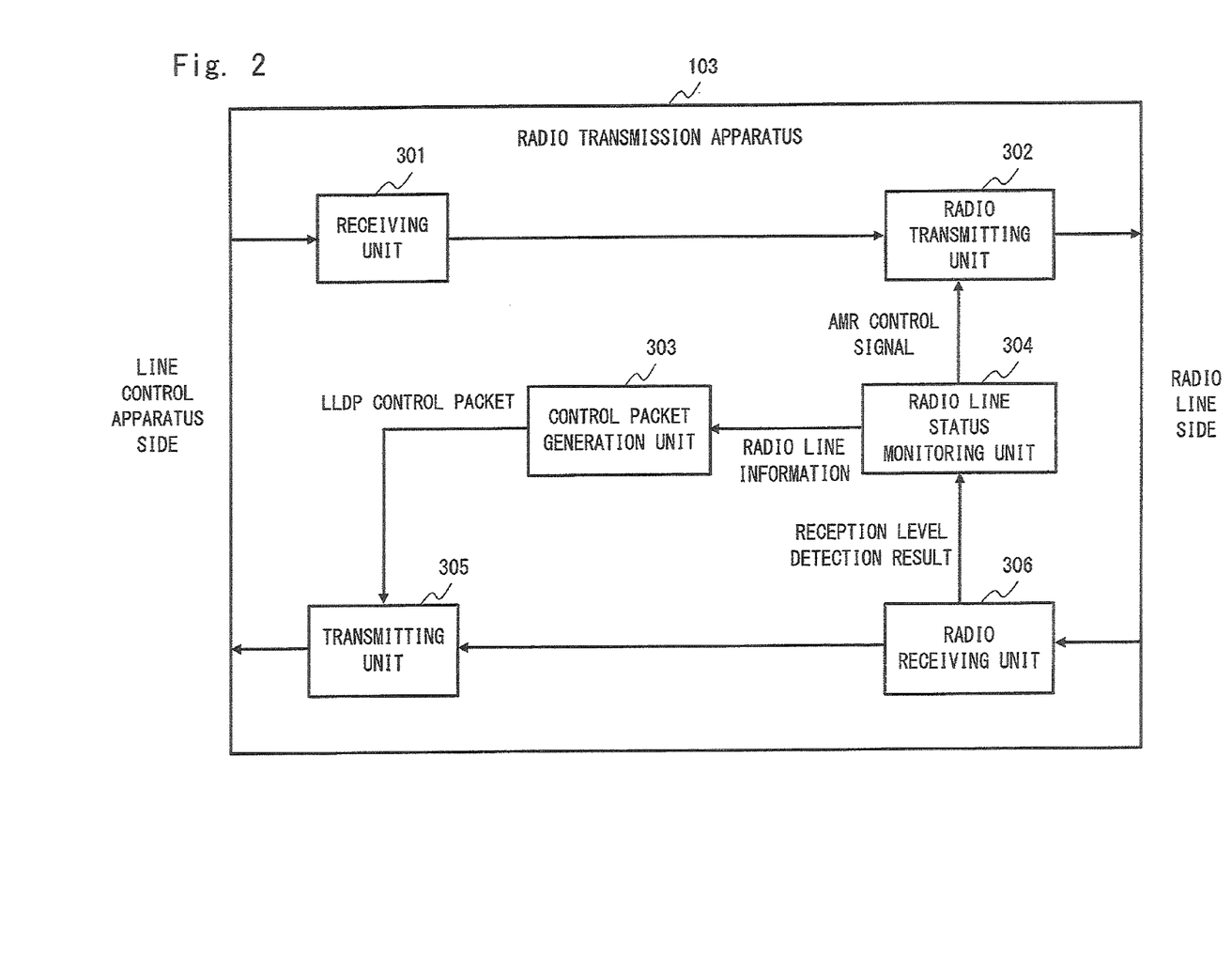
FIG. 2 is a configuration diagram of a radio transmission apparatus according to the first exemplary embodiment.

Next, a configuration example of the radio transmission apparatus 103 according to the first exemplary embodiment of the present invention is explained with reference to FIG. 2. Each of the radio transmission apparatuses 104 to 108 has a configuration similar to that of the radio transmission apparatus 103, and therefore their explanations are omitted. The radio transmission apparatus 103 includes a receiving unit 301, a radio transmitting unit 302, a control packet generation unit 303, a radio line status monitoring unit 304, a transmitting unit 305, and a radio receiving unit 306.

The radio receiving unit 306 receives data transmitted form the radio transmission apparatus 104 through the radio line 1. The radio receiving unit 306 detects the reception level of the received data. Alternatively, the radio receiving unit 306 may detect the amplitude value or the like of the received data. The radio receiving unit 306 outputs the reception level detection result to the radio line status monitoring unit 304. Further, the radio receiving unit 306 demodulates the received packet(s) and outputs demodulated data (hereinafter called "user data") to the transmitting unit 305.

The radio line status monitoring unit 304 determines the presence/absence of the occurrence of a radio line disconnection based on the reception level detection result. For example, when the reception level is lower than a predetermined reference value, the radio line status monitoring unit 304 may presume that the radio line 1 is in a disconnected state. When the reception level is higher than the predetermined reference value, the radio line status monitoring unit 304 may presume that the radio line 1 is in a connected state. Note that the method for detecting the presence/absence of the occurrence of a radio line disconnection in the radio line 1 is not limited to the above-described method. For example, control data may be transmitted between the radio transmission apparatuses 103 and 104 at predetermined timings. Then, when the control data cannot be received, it is presumed that the radio line 1 is in a disconnected state.

Further, the radio line status monitoring unit 304 may determine whether the modulation method applied to the radio line has been changed or not based on the reception level detection result. Similarly to the presence/absence of the occurrence of a radio line disconnection, the radio line status monitoring unit 304 may determine the applied modulation method according to whether the reception level is higher or lower than a predetermined reference value. For example, when the reception level is high, the radio line status monitoring unit 304 may determine that a modulation method by which a relatively large amount of data can be transmitted is used. Further, when the reception level is low, the radio line status monitoring unit 304 may determine that a modulation method by which only a relatively small amount of data can be transmitted is used. Note that the determination of the applied nodulation method is not limited to the above-described method.

For example, the radio line status monitoring unit 304 may determine whether the modulation method has been changed or not by receiving information about the throughput of the data received from the radio receiving unit 306. The radio receiving unit 306 may measure the throughput for the received data when the radio receiving unit 306 receives data transmitted from the radio transmission apparatus 104 through the radio line 1. When the throughput of the received data is higher than a reference value, the radio line status monitoring unit 304 may determine that a modulation method having a large modulation level such as 256QAM is used. Further, when the throughput of the received data is lower than the reference value, the radio line status monitoring unit 304 may determine that a modulation method having a small modulation level such as 64QAM is used.

The radio line status monitoring unit 304 outputs radio line information indicating the presence/absence of the disconnection of the radio line 1, the change of the modulation method, or the like to the control packet generation unit 303. Further, when the radio line status monitoring unit 304 determines that the modulation method has been changed, the radio line status monitoring unit 304 outputs an AMR control signal indicating the changed modulation method (i.e., new modulation method) to the radio transmitting unit 302.

The control packet generation unit 303 receives the radio line information from the radio line status monitoring unit 304. The control packet generation unit 303 generates a control packet based on the radio line information. The control packet generation unit 303 outputs the generated control packet to the transmitting unit 305. The control packet is used to notify the line control apparatus 101 of the line state of the radio line 1.

Figure 3:
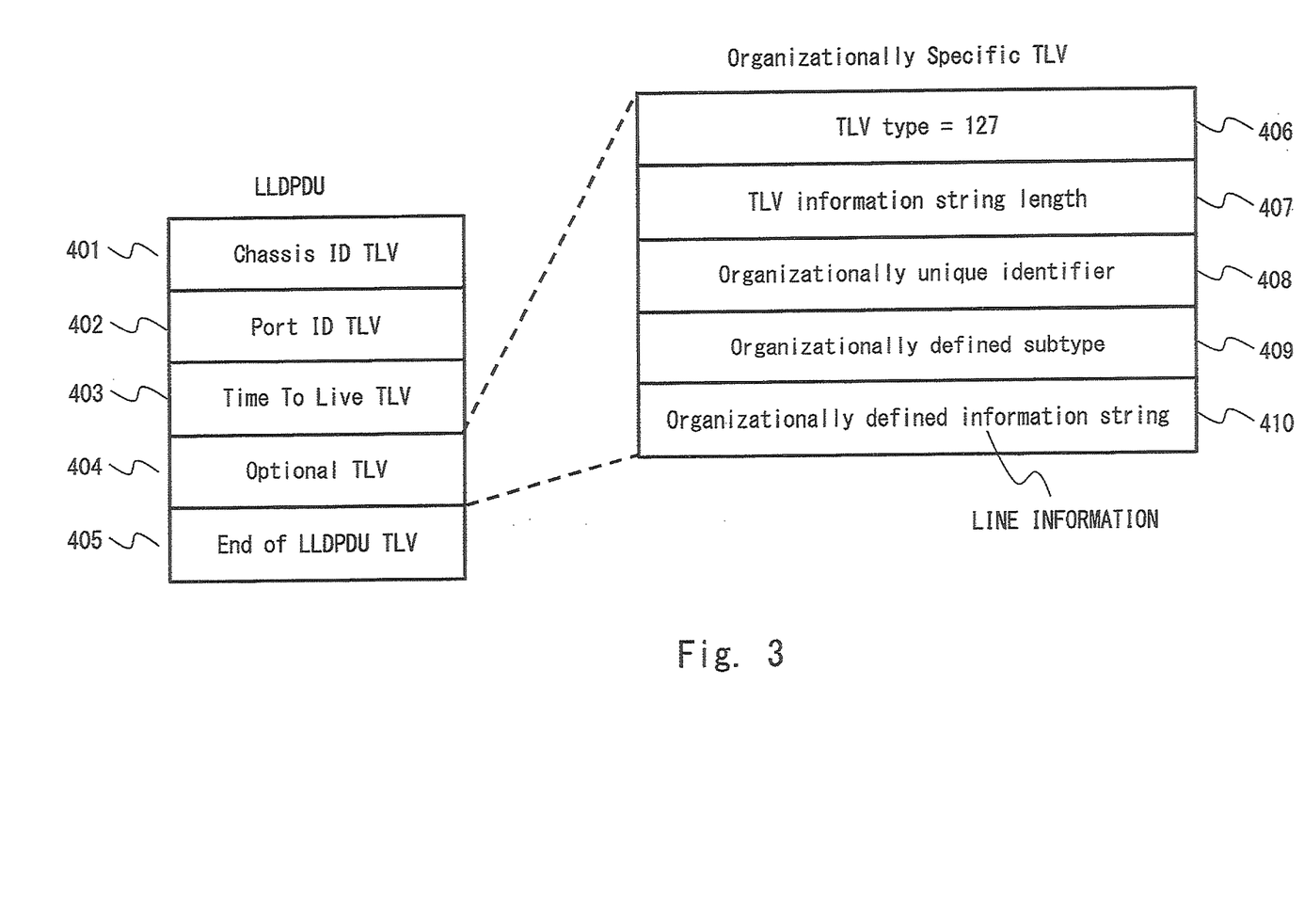
FIG. 3 is a structure diagram of a control packet according to the first exemplary embodiment.

A structure example of a control packet is explained hereinafter with reference to FIG. 3. FIG. 3 shows a configuration example of LLDPDU specified in IEEE802.1AB. The LLDPDU is used as an LLDP control packet. The LLDPDU consists of Chassis ID TLV 401, Port ID TLV 402, Time To Live TLV 403, Optional TLV 404, and End of LLDPDU TLV 405. The Chassis ID TLV 401 indicates the identification information of an apparatus. The Port ID TLV 402 indicates the identification information of a port. The Time To Live TLV 403 indicates a validity period. The Optional TLV 404 is a field that can be arbitrarily added by a user. The End of LLDPDU TLV 405 indicates the termination of the LLDPDU.

When the Optional TLV 404 is used as Organizationally Specific TLV, it is possible to define a TLV type 406, a TLV information string length 407, an Organizationally unique identifier 408, an Organizationally defined subtype 409, and an Organizationally defined information string 410 in the Optional TLV 404.

The control packet generation unit 303 specifies the Optional TLV 404 of the LLDPDU as Organizationally Specific TLV and multiplexes the line information onto the Organizationally defined information string 410 field.

Referring to FIG. 2 again, the transmitting unit 305 transmits the user data output from the radio receiving unit 306 and the control packet output from the control packet generation unit 303 to the line control apparatus 101.

The receiving unit 301 receives the packet transmitted from the line control apparatus 101. Further, the receiving unit 301 outputs the received packet to the radio transmitting unit 302. The radio transmitting unit 302 modulates the packet output from the receiving unit 301 and transmits the modulated packet to the control apparatus 104 through the radio line 1. Note that when the radio transmitting unit 302 receives an AMR control signal from the radio line status monitoring unit 304, the radio transmitting unit 302 modulates the packet output from the receiving unit 301 by a modulation method indicated in the AMR control signal.

Figure 4:
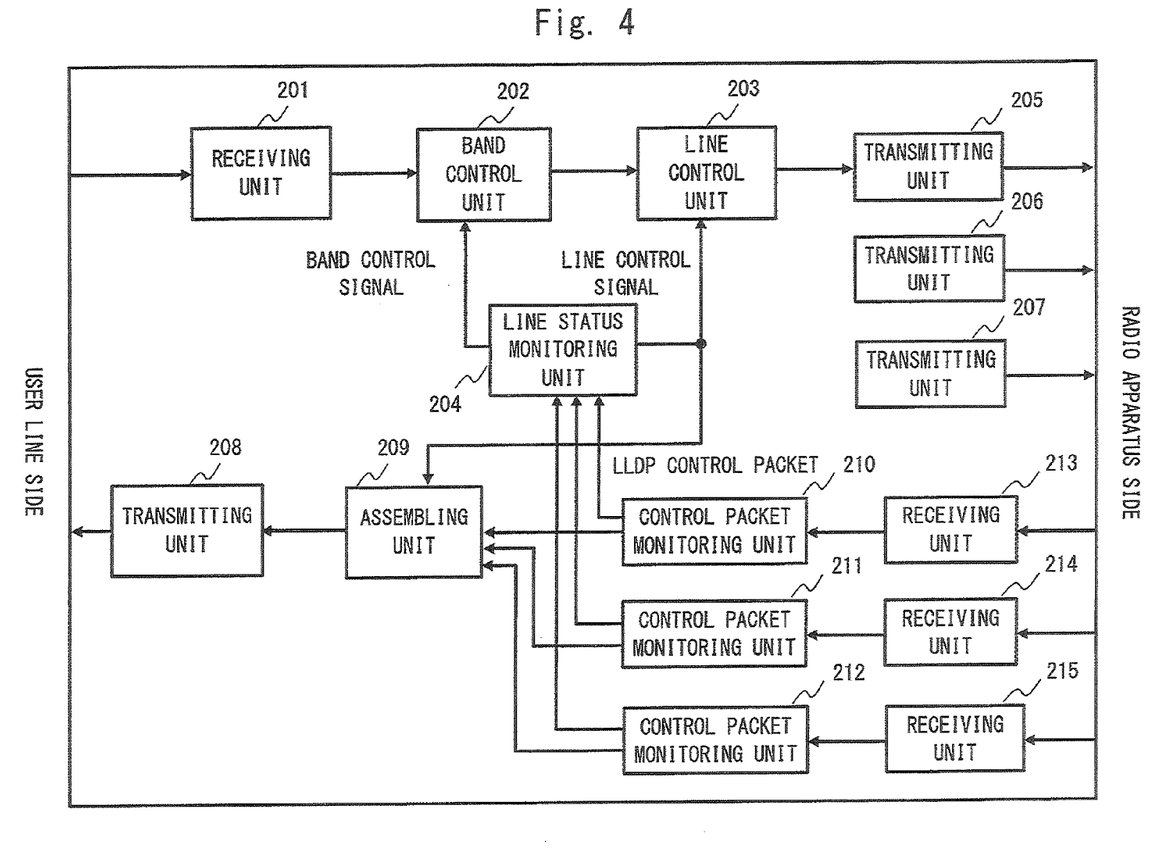
FIG. 4 is a configuration diagram of a line control apparatus according to the first exemplary embodiment.

Next, a configuration example of the line control apparatus 101 according to the first exemplary embodiment of the present invention is explained with reference to FIG. 4. The control apparatus 102 has a configuration similar to that of the line control apparatus 101, and therefore its explanation is omitted. The line control apparatus 101 includes a receiving unit 201, a band control unit 202, a line control unit 203, a line status monitoring unit 204, transmitting units 205 to 207, a transmitting unit 208, an assembling unit 209, control packet monitoring units 210 to 212, and receiving units 213 to 215.

The receiving units 213 to 215 receive packets transmitted from the radio transmission apparatuses 103, 105 and 107 and outputs the received packets to the control packet monitoring units 210 to 212. The control packet monitoring units 210 to 212 determine whether or not there is a control packet in the received packets. When there is a control packet, the control packet monitoring units 210 to 212 output the control packet to the line status monitoring unit 204. Further, the control packet monitoring units 210 to 212 output user data to the assembling unit 209.

The assembling unit 209 unifies the user data output from the control packet monitoring units 210 to 212 into a single traffic. In other words, the assembling unit 209 assembles user data output from the control packet monitoring units 210 to 212 into a single traffic. The assembling unit 209 outputs the user data, which were unified into the single traffic, to the transmitting unit 208. Further, the transmitting unit 208 outputs the received user data to the user line(s).

The line status monitoring unit 204 reads out line information contained in the Organizationally defined information string 410 of the received control packet. Note that when information indicating that the radio line 1 is in a disconnected state is contained in the line information, the line status monitoring unit 204 outputs a band setting value that is calculated by subtracting an amount corresponding to the transmission band of the radio line 1 from the total transmission band of the three radio lines to the band control unit 202 as a band control signal. Further, the line status monitoring unit 204 outputs the line disconnection information of the radio line 1 to the line control unit 203 and the assembling unit 209 as a line control signal. Note that when the assembling unit 209 assembles the user data into a single traffic, the assembling unit 209 excludes the radio line 1 from the radio lines to be assembled.

When information indicating that the modulation method for the radio line 1 has been changed is contained in the line information, the line status monitoring unit 204 outputs a band setting value that is obtained by recalculating the total transmission band of the three radio lines while reflecting the modulation method change of the radio line 1 in the recalculation to the band control unit 202 as a band control signal.

The receiving unit 201 receives a packet transmitted through the user line and outputs the received packet to the band control unit 202.

The band control unit 202 performs band control in accordance with the band setting value set in the band control signal, and outputs the packet output from the receiving unit 201 to the line control unit 203. Note that the band setting value is a value in which the disconnected state of the radio line 1, the modulation method change state, or the like has been reflected. Therefore, the band control unit 202 can perform band control based on the band setting value and hence can perform the band control according to the transmission band before packets are distributed into respective radio lines. Therefore, it is possible to prevent unnecessary traffic from flowing into those radio lines.

The line control unit 203 distributes packets into the transmitting units 205 to 207, which send out transmission packets to their respective radio lines, in accordance with the line control signal output from the line status monitoring unit 204. The line control signal includes the line disconnection information of a radio line(s). Therefore, the line control unit 203 excludes a radio line that is in a disconnected state from the radio lines into which the packets are distributed. In this way, by excluding a line(s) in which a line disconnection has occurred from the lines to be bonded, it is possible to use the radio band with efficiency and to prevent an unnecessary traffic inflow.

Figure 5:
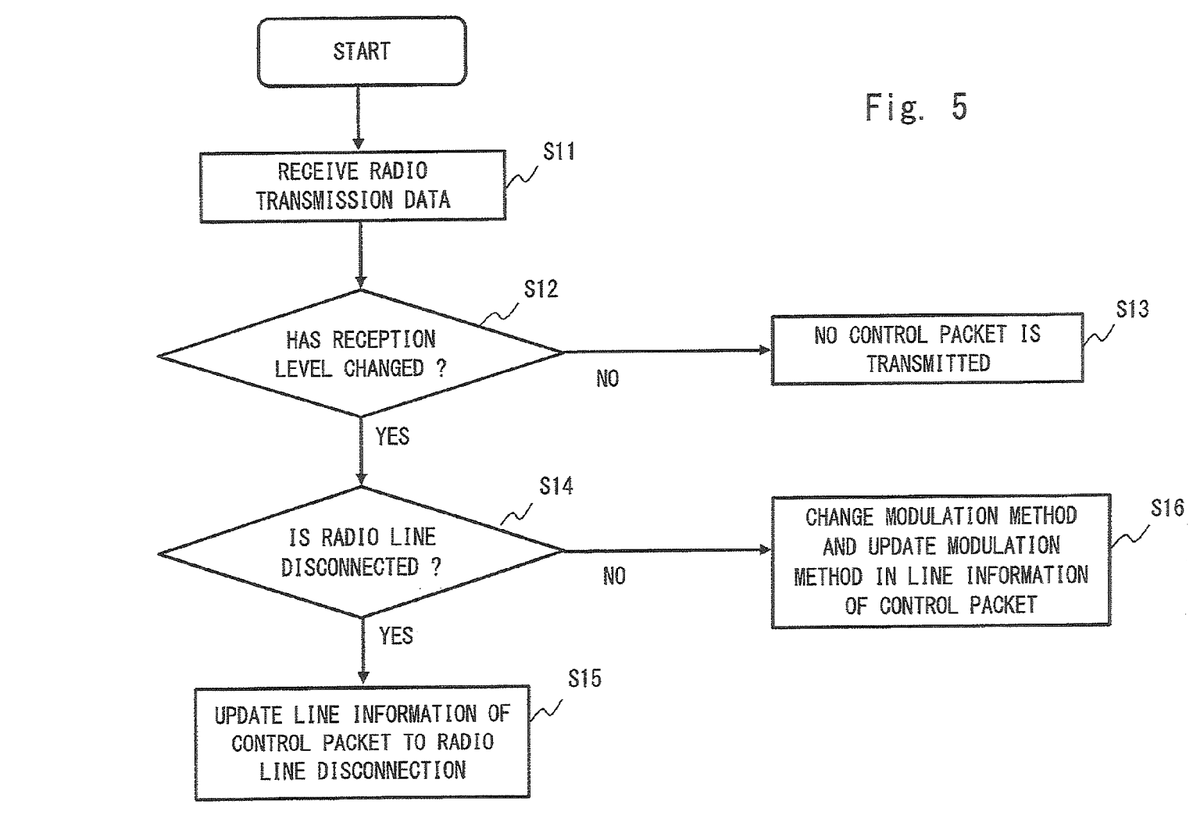
FIG. 5 is a flowchart showing a control packet generation process according to the first exemplary embodiment.

Next, a control packet generation process flow in the radio transmission apparatus according to the first exemplary embodiment of the present invention is explained with reference to FIG. 5. Firstly, the radio receiving unit 306 of the radio transmission apparatus receives radio transmission data through a radio line (S11). Next, the radio line status monitoring unit 304 determines whether or not there is a fluctuation in the reception level of the radio transmission data (S12). When the radio line status monitoring unit 304 determines that there is no fluctuation in the reception level of the radio transmission data, the radio line status monitoring unit 304 presumes that the modulation method has not been changed and no radio line disconnection has occurred, and thus does not generate any control packet (S13). When radio line status monitoring unit 304 determines that there is a fluctuation in the reception level of the radio transmission data, the radio line status monitoring unit 304 determines whether or not any radio line disconnection has occurred (S14). For example, the radio line status monitoring unit 304 may presume that a disconnection has occurred when the reception level of the radio transmission data is equal to or lower than a reference value. Further, when the reception level of the radio transmission data is equal to or greater than a reference value, the radio line status monitoring unit 304 identifies the modulation method according to the reception level.

When the radio line status monitoring unit 304 presumes that a radio line disconnection has occurred, the control packet generation unit 303 generates a control packet containing line information indicating a radio line disconnection (S15). When the radio line status monitoring unit 304 determines that the modulation method has been changed and identifies the changed modulation method (i.e., new modulation method), the control packet generation unit 303 generates a control packet containing line information in which the changed modulation method is set (S16).

Figure 6:
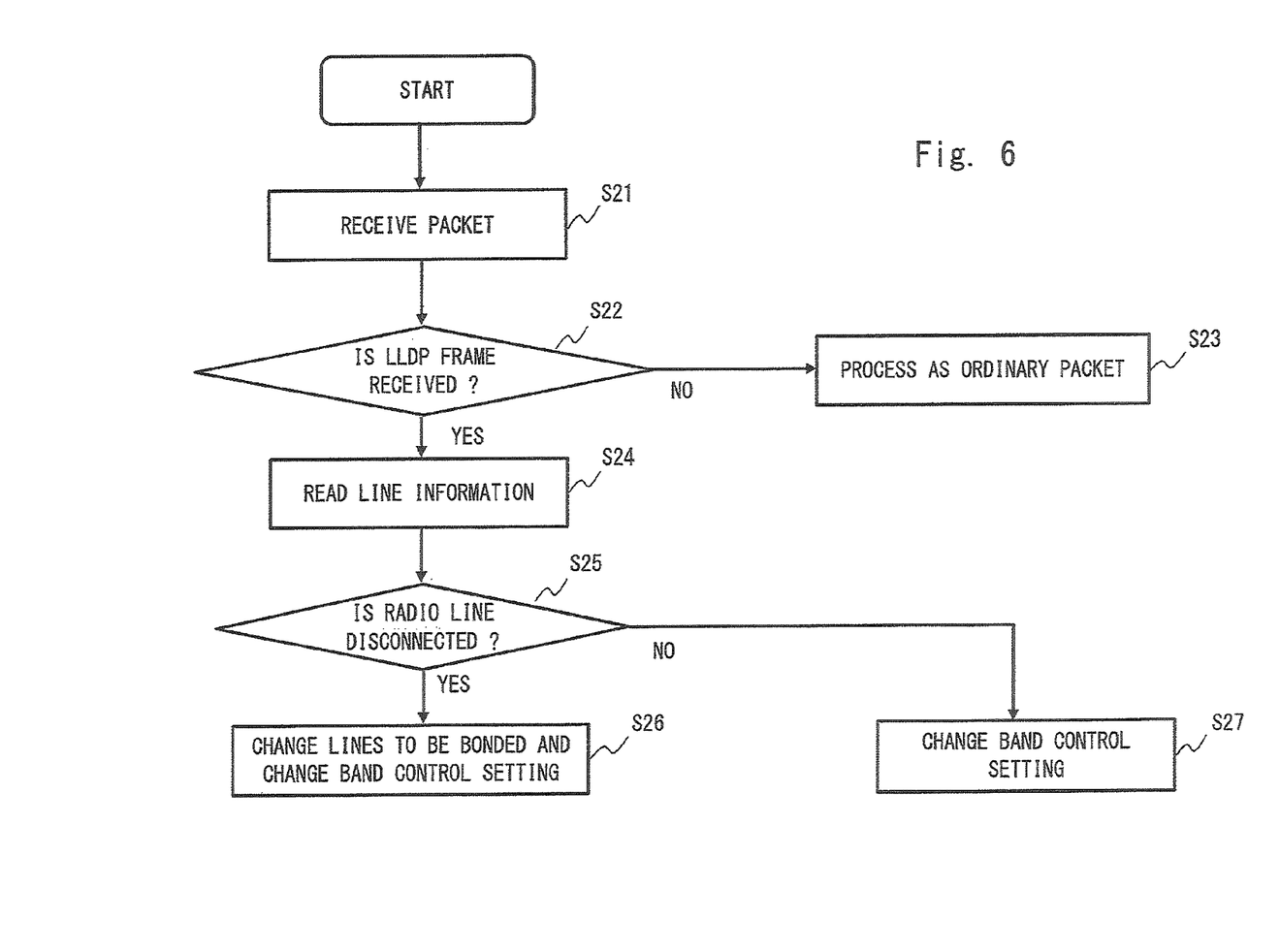
FIG. 6 is a flowchart showing a line control process according to the first exemplary embodiment.

Next, a line control process flow in the line control apparatus according to the first exemplary embodiment of the present invention is explained with reference to FIG. 6. Firstly, the receiving units 213 to 215 of the line control apparatus receive packet data from the radio transmission apparatus (S21). Next, the control packet monitoring units 210 to 212 determines whether or not an LLDP control packet is contained in the received data (S22). When no LLDP control packet is contained in the received data, the line status monitoring unit 204 generates neither the line control signal nor the band control signal. Further, the assembling unit 209 and the transmitting unit 208 output user data to the user line (S23).

When an LLDP control packet is contained in the received data, the line status monitoring unit 204 reads out line information contained in the Organizationally defined information string 410 of the LLDP control packet (S24).

Next, the line status monitoring unit 204 determines whether or not information about a radio line disconnection is set in the line information (S25). When the information about a radio line disconnection is set in the line information, the line status monitoring unit 204 outputs a band setting value that is calculated by subtracting an amount corresponding to the transmission band of the radio line in the disconnected state from the total transmission band of all the radio lines to the band control unit 202 as a band control signal. Further, the line status monitoring unit 204 outputs the line disconnection information of the radio line to the line control unit 203 and the assembling unit 209 as a line control signal. When information about a modulation method change, rather than the information about a radio line disconnection, is set in the line information, the line status monitoring unit 204 outputs a band setting value that is obtained by recalculating the total transmission band of all the radio lines while reflecting the modulation method change of the radio line for which the modulation method has been changed in the recalculation to the band control unit 202 as a band control signal (S27).

As explained above, even when the line control apparatus is disposed as an apparatus different from the radio transmission apparatus as in the case of the communication system according to the first exemplary embodiment of the present invention, the line control apparatus can receive a control packet in which a line state is set from the radio transmission apparatus. The line control apparatus can perform the band control and the line bonding control according to the line state.

Second Exemplary Embodiment

Next, a configuration example of a communication system according to a second exemplary embodiment of the present invention is explained with reference to FIG. 7. This figure shows a configuration that is obtained by adding a communication system control apparatus 150 in the communication system shown in FIG. 1. The configuration other than the communication system control apparatus 150 is similar to that of the communication system shown in FIG. 1, and therefore its detailed explanation is omitted.

The communication system control apparatus 150 is connected to the line control apparatuses 101 and 102. Further, the communication system control apparatus 150 is also connected to the radio transmission apparatuses 103 to 108. Each of the radio transmission apparatuses 103 to 108 has a configuration that is obtained by further incorporating an interface for communicating with the communication system control apparatus 150 into the configuration shown in FIG. 2. Similarly, each of the line control apparatuses 101 and 102 has a configuration that is obtained by further incorporating an interface for communicating with the communication system control apparatus 150 into the configuration shown in FIG. 3.

Figure 8:
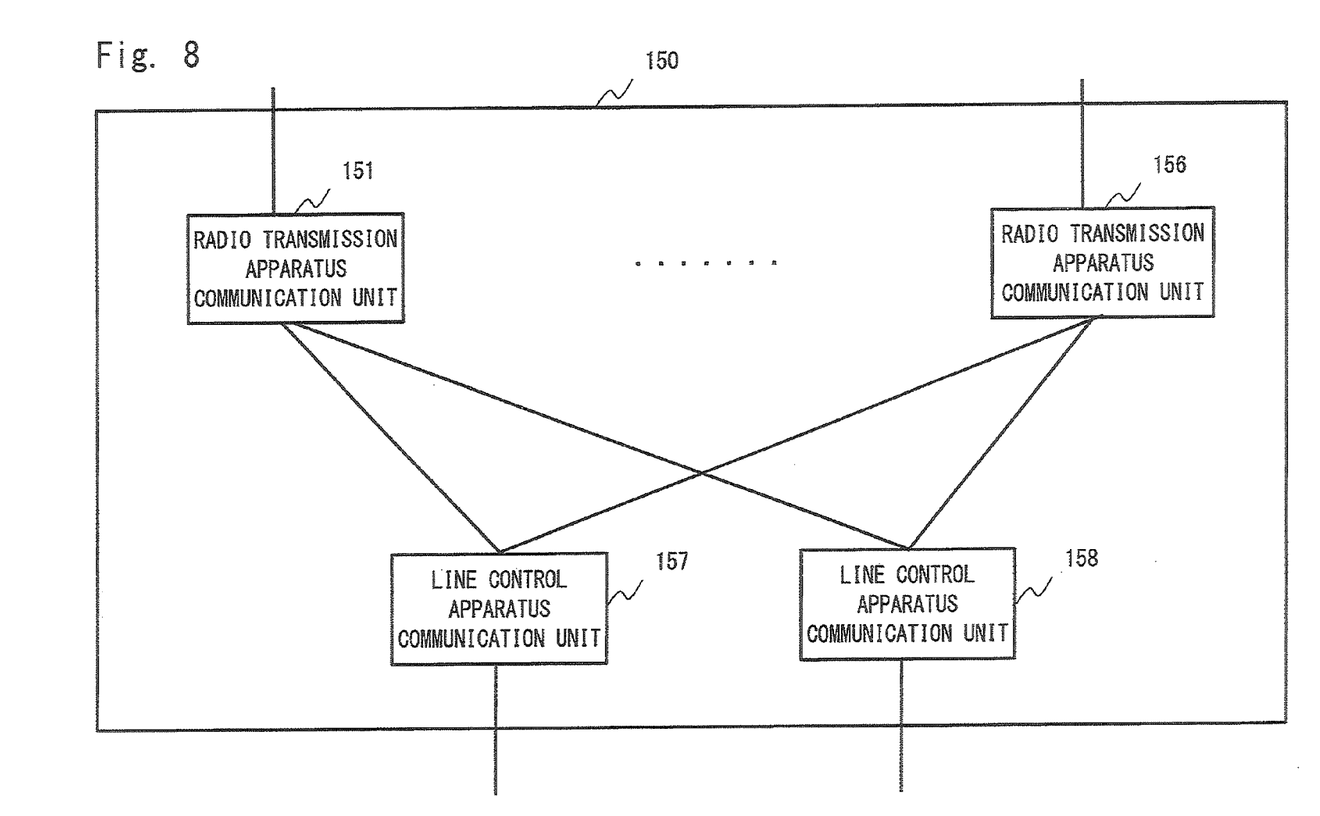
FIG. 8 is a configuration diagram of a communication system control apparatus according to the second exemplary embodiment.

Next, a configuration example of the communication system control apparatus 150 according to the second exemplary embodiment of the present invention is explained with reference to FIG. 8. The communication system control apparatus 150 includes radio transmission apparatus communication units 151 to 156, a line control apparatus communication unit 157, and a line control apparatus communication unit 158. The radio transmission apparatus communication unit 151 transmits/receives data between the radio transmission apparatus communication unit 151 and the radio transmission apparatus 103. Similarly, the radio transmission apparatus communication units 152 to 156 transmit/receive data between the radio transmission apparatus communication units 152 to 156 and the radio transmission apparatuses 104 to 108, respectively.

The radio transmission apparatus communication units 151 to 156 receive control packets from the radio transmission apparatuses 103 to 108. The control packet contains information indicating the line state of a radio line(s). Further, the radio transmission apparatus communication units 151 to 156 may receive LLDP control packets from the radio transmission apparatuses 103 to 108 as the control packets. The radio transmission apparatus communication units 151 to 156 outputs the control packets to the line control apparatus communication units 157 and 158.

The line control apparatus communication unit 157 receives a control packet from each of the radio transmission apparatus communication units 151 to 156. Further, the line control apparatus communication unit 157 transmits the received control packet to the line control apparatus 101. Similarly, the line control apparatus communication unit 158 receives a control packet from each of the radio transmission apparatus communication units 151 to 156. Further, the line control apparatus communication unit 157 transmits the received control packet to the line control apparatus 102.

The line control apparatus communication unit 157 can transmit not only control packets received from the radio transmission apparatuses 103, 105 and 107 but also control packets received from the radio transmission apparatuses 104, 106 and 108 to the line control apparatus 101. The line control apparatus communication unit 158 can transmit not only control packets received from the radio transmission apparatuses 104, 106 and 108 but also control packets received from the radio transmission apparatuses 103, 105 and 107 to the line control apparatus 102.

An example case where a malfunction or a failure occurs in the radio transmission apparatus 103 and hence the radio line 1 is disconnected is explained. In such a case, in the configuration of the communication system shown in FIG. 1, since a malfunction or a failure has occurred in the radio transmission apparatus 103, it is impossible to transmit a control packet directly from the radio transmission apparatus 103 to the line control apparatus 101. Therefore, the line control apparatus 101 cannot detect the line disconnection of the radio line 1.

Figure 7:
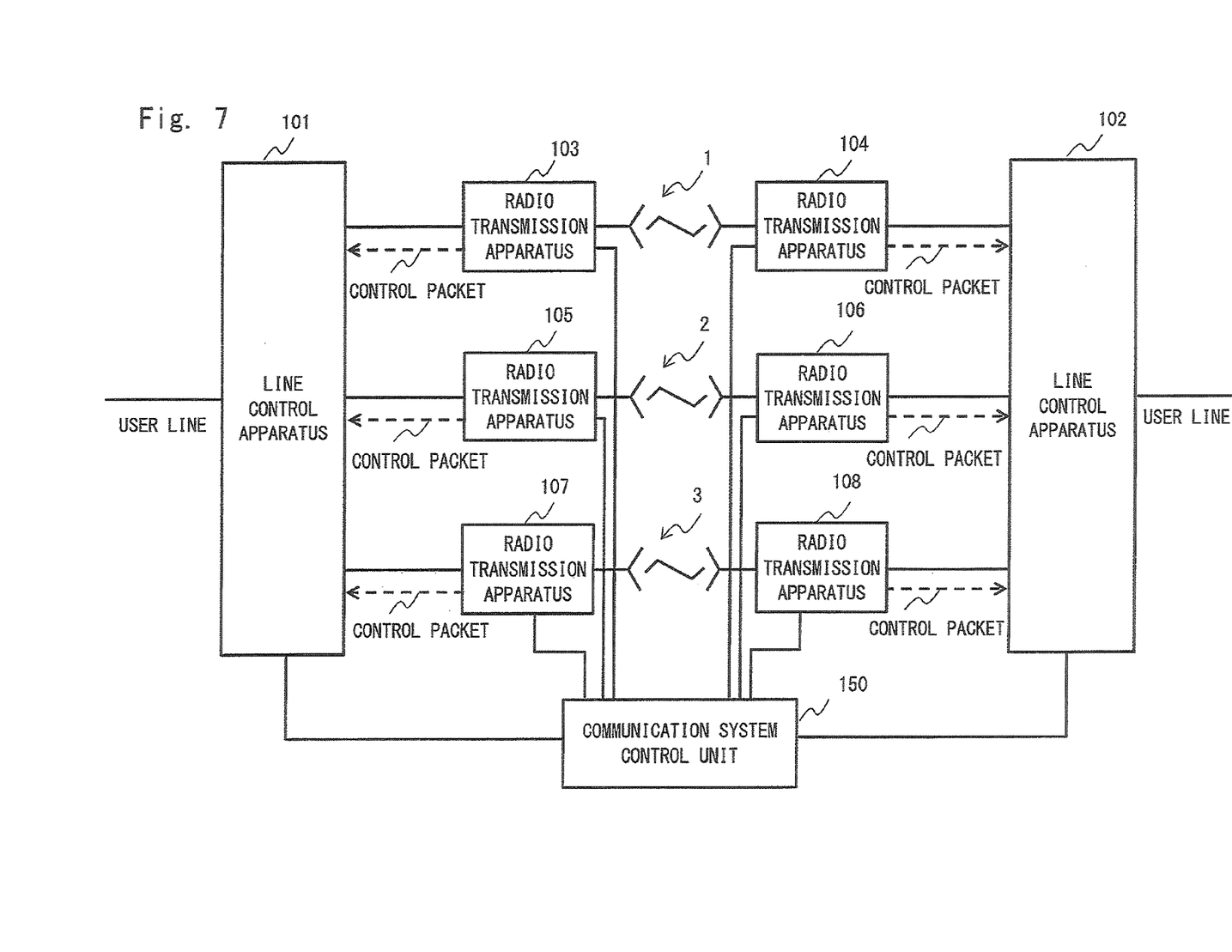
FIG. 7 is a diagram of a communication system according to a second exemplary embodiment.

In contrast to this, by using the communication system control apparatus 150 as shown in FIG. 7, the line control apparatus 101 can receive a control packet from the radio transmission apparatus 104 through the communication system control apparatus 150. In this way, even when a malfunction or a failure occurs in the radio transmission apparatus 103 and hence the radio line 1 is disconnected, it is possible to detect the line disconnection of the radio line 1 by receiving a control packet from the radio transmission apparatus 104. That is, even when the line control apparatuses 101 and 102 cannot receive a control packet from radio transmission apparatuses that are directly connected to them, the line control apparatuses 101 and 102 can receive a control packet from the radio transmission apparatuses that are opposed to those directly-connected line control apparatuses through the communication system control apparatus 150. As a result, it is possible to detect the line disconnection of a radio line(s).

Note that the present invention is not limited to the above-described exemplary embodiments, and various modifications can be made as appropriate without departing from the spirit of the present invention. For example, the communication format for the control packet is not limited to the Organizationally Specific TLV field of the LLDP. That is, Link OAM specified in IEEE802.3ah and VSP of Ethernet (Registered trademark) OAM specified in ITU-T Y.1731 can also be used.

Although the present invention is described as a hardware configuration in the above-described exemplary embodiments, the present invention is not limited to the hardware configurations. In the present invention, the processes of the radio transmission apparatus and the line control apparatus can also be implemented by causing a CPU (Central Processing Unit) to execute a computer program.

In the above-described examples, the program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

The whole or part of the exemplary embodiments disclosed above can be described as, but not limited to, the following supplementary notes.

(Supplementary Note 1)

A communication system comprising: a first transmission apparatus that terminates a first communication line; a second transmission apparatus that terminates a second communication line; and a line control apparatus that performs data communication with the first and second transmission apparatuses, wherein the first transmission apparatus is configured to monitor a line state of the first communication line and notifies the line control apparatus of the line state by using a first control packet, the line state being set in the first control packet, the second transmission apparatus is configured to monitor a line state of the second communication line and notifies the line control apparatus of the line state by using a second control packet, the line state being set in the second control packet, and the line control apparatus is configured to control data to be output to the first and second transmission apparatuses based on the line state.

(Supplementary Note 2)

The communication system described in Supplementary note 1, wherein the first and second control packets are specified according to a protocol by which information about network topology is sent between neighboring apparatuses.

(Supplementary Note 3)

The communication system described in Supplementary note 1 or 2, wherein the first transmission apparatus monitors a presence/absence of an occurrence of a line disconnection of the first communication line and notifies the line control apparatus of the presence/absence of the occurrence of the line disconnection of the first communication line, and the second transmission apparatus monitors a presence/absence of an occurrence of a line disconnection of the second communication line and notifies the line control apparatus of the presence/absence of the occurrence of the line disconnection of the second communication line.

(Supplementary Note 4)

The communication system described in any one of Supplementary notes 1 to 3, wherein the first and second communication lines are radio communication lines, the first transmission apparatus monitors a modulation method for the first communication line and notifies the line control apparatus of the modulation method for the first communication line, and the second transmission apparatus monitors a modulation method for the second communication line and notifies the line control apparatus of the modulation method for the second communication line.

(Supplementary Note 5)

The communication system described in any one of Supplementary notes 1 to 4, wherein the line control apparatus distributes data to be output to the first and second transmission apparatus based on the line state.

(Supplementary Note 6)

The communication system described in Supplementary note 5, wherein the line control apparatus stops outputting data to the first transmission apparatus when an occurrence of a line disconnection of the first communication line is detected.

(Supplementary Note 7)

The communication system described in Supplementary note 4, wherein the line control apparatus changes a band of data to be output to the first and second communication lines when a change of a modulation method of at least one of the first and second communication lines is detected.

(Supplementary Note 8)

The communication system described in any one of Supplementary notes 1 to 7, wherein the first and second control packets are LLDP control packets.

(Supplementary Note 9)

A transmission apparatus comprising: a line termination unit that terminates a communication line; a line state monitoring unit that monitors a line state of the communication line; a control packet generation unit that generates a control packet, the line state being set in the control packet; and a transmitting unit that transmits the control packet to a line control unit, the line control unit being configured to control data to be output to a plurality of transmission apparatuses.

(Supplementary Note 10)

The transmission apparatus described in Supplementary note 9, wherein the control packet is specified according to a protocol by which information about network topology is sent between neighboring apparatuses.

(Supplementary Note 11)

The transmission apparatus described in Supplementary note 9 or 10, wherein the line state monitoring unit monitors a presence/absence of an occurrence of a line disconnection of the communication line, and the transmitting unit notifies the line control apparatus of the presence/absence of the occurrence of the line disconnection of the communication line.

(Supplementary Note 12)

The transmission apparatus described in any one of Supplementary notes 9 to 11, wherein the communication line is a radio communication line, and the line state monitoring unit monitors a modulation method for the communication line, and the transmitting unit notifies the line control apparatus of the modulation method for the communication line.

(Supplementary Note 13)

The transmission apparatus described in Supplementary note 10, wherein the control packet is an LLDP control packet.

(Supplementary Note 14)

A line control apparatus comprising: a transmitting unit that performs data communication with a first transmission apparatus and a second transmission apparatus, the first transmission apparatus being configured to terminate a first communication line, the second transmission apparatus being configured to terminate a second communication line; and a line control unit that controls data to be output to the first and second transmission apparatuses based on a line state of the first communication line set in a first control packet and a line state of the second communication line set in a second control packet, the first control packet being transmitted from the first transmission apparatus, the second control packet being transmitted from the second transmission apparatus.

(Supplementary Note 15)

The line control apparatus described in Supplementary note 14, wherein the first and second control packets are specified according to a protocol by which information about network topology is sent between neighboring apparatuses.

(Supplementary Note 16)

The line control apparatus described in Supplementary note 14 or 15, wherein the line control unit distributes data to be output to the first and second transmission apparatus based on the line state.

(Supplementary Note 17)

The line control apparatus described in Supplementary note 16, wherein the line control unit stops outputting data to the first transmission apparatus when an occurrence of a line disconnection of the first communication line is detected.

(Supplementary Note 18)

The line control apparatus described in any one of Supplementary notes 14 to 17, wherein the line control unit changes a band of data to be output to the first and second communication lines when a change of a modulation method of at least one of the first and second communication lines is detected.

(Supplementary Note 19)

The line control apparatus described in any one of Supplementary notes 14 to 18, wherein the first and second control packets are LLDP control packets.

(Supplementary Note 20)

A line state monitoring method comprising: monitoring a line state of a communication line based on data received from the communication line; generating a control packet, the line state being set in the control packet; and transmitting the control packet to a line control apparatus, the line control apparatus being configured to control data to be output to a plurality of transmission apparatuses.

(Supplementary Note 21)

A data output control method for controlling data to be output to first and second transmission apparatuses based on a line state of a first communication line set in a first control packet and a line state of a second communication line set in a second control packet, the first control packet being transmitted from the first transmission apparatus, the second control packet being transmitted from the second transmission apparatus, the first transmission apparatus being configured to terminate the first communication line, the second transmission apparatus being configured to terminate the second communication line.

(Supplementary Note 22)

A program that causes a computer to execute: a step of monitoring a line state of a communication line based on data received from the communication line; a step of generating a control packet, the line state being set in the control packet; and a step of transmitting the control packet to a line control apparatus, the line control apparatus being configured to control data to be output to a plurality of transmission apparatuses.

(Supplementary Note 23)

A program that causes a computer to execute a step of controlling data to be output to first and second transmission apparatuses based on a line state of a first communication line set in a first control packet and a line state of a second communication line set in a second control packet, the first control packet being transmitted from the first transmission apparatus, the second control packet being transmitted from the second transmission apparatus, the first transmission apparatus being configured to terminate the first communication line, the second transmission apparatus being configured to terminate the second communication line.

Although the present invention is explained above with reference to exemplary embodiments, the present invention is not limited to the above-described exemplary embodiments. Various modifications that can be understood by those skilled in the art can be made to the configuration and details of the present invention within the scope of the invention.

This application is based upon and claims the benefit of priority from Japanese patent application No. 2012-070785, filed on Mar. 27, 2012, the disclosure of which is incorporated herein in its entirety by reference.

REFERENCE SIGNS LIST

101 LINE CONTROL APPARATUS
102 LINE CONTROL APPARATUS
103-108 RADIO TRANSMISSION APPARATUS
150 COMMUNICATION SYSTEM CONTROL APPARATUS
151-156 RADIO TRANSMISSION APPARATUS COMMUNICATION UNIT
157 LINE CONTROL APPARATUS COMMUNICATION UNIT
158 LINE CONTROL APPARATUS COMMUNICATION UNIT
201 RECEIVING UNIT
202 BAND CONTROL UNIT
203 LINE CONTROL UNIT
204 LINE STATUS MONITORING UNIT
205-207 TRANSMITTING UNITS
208 TRANSMITTING UNIT
209 ASSEMBLING UNIT
210-212 CONTROL PACKET MONITORING UNIT
213-215 RECEIVING UNITS
301 RECEIVING UNIT
302 RADIO TRANSMITTING UNIT
303 CONTROL PACKET GENERATION UNIT
304 RADIO LINE STATUS MONITORING UNIT
305 TRANSMITTING UNIT
306 RADIO RECEIVING UNIT
401 Chassis ID TLV
402 Port ID TLV
403 Time To Live TLV
404 Optional TLV
405 End of LLDPDU TLV
406 TLV type
407 TLV information string length
408 Organizationally unique identifier
409 Organizationally defined subtype
410 Organizationally defined information string

The invention claimed is:

1. A communication system, comprising:
a first transmission apparatus that terminates a first communication line;
a second transmission apparatus that terminates a second communication line; and
a line control apparatus that performs data communication with the first and second transmission apparatuses, wherein
the first transmission apparatus is configured to monitor a line state of the first communication line and notify the line control apparatus of the line state of the first communication line by using a first control packet, the line state being set in the first control packet,
the second transmission apparatus is configured to monitor a line state of the second communication line and notify the line control apparatus of the line state of the second communication line by using a second control packet, the line state being set in the second control packet, and the line control apparatus is configured to set a band setting value based on a total transmission band of the first communication line and the second communication line after a change of a modulation method, perform band control in accordance with the band setting value, and then transmit data to the first transmission apparatus and the second transmission apparatus when the change of a modulation method of at least one of the first and second communication lines is detected.

2. The communication system according to claim 1, wherein the first and second control packets are specified according to a protocol by which information about network topology is sent between neighboring apparatuses.

3. The communication system according to claim 1, wherein the first transmission apparatus monitors a presence/absence of an occurrence of a line disconnection of the first communication line and notifies the line control apparatus of the presence/absence of the occurrence of the line disconnection of the first communication line, and wherein the second transmission apparatus monitors a presence/absence of an occurrence of a line disconnection of the second communication line and notifies the line control apparatus of the presence/absence of the occurrence of the line disconnection of the second communication line.

4. The communication system according to claim 1, wherein the first and second communication lines comprise radio communication lines, wherein the first transmission apparatus monitors the modulation method for the first communication line and notifies the line control apparatus of the modulation method for the first communication line, and wherein the second transmission apparatus monitors the modulation method for the second communication line and notifies the line control apparatus of the modulation method for the second communication line.

5. The communication system according to claim 1, wherein the line control apparatus distributes data to be output to the first transmission apparatus and second transmission apparatus based on the line state of the first and second communication lines.

6. The communication system according to claim 5, wherein the line control apparatus stops outputting data to the first transmission apparatus when an occurrence of a line disconnection of the first communication line is detected.

7. The communication system according to claim 1, wherein the first and second control packets comprise Link Layer Discovery Protocol (LLDP) control packets.

8. The communication system according to claim 1, wherein the line control apparatus aggregates the first and second transmission apparatuses to carry out the band control.

9. The communication system according to claim 1, wherein the line control apparatus executes the band control using the change of the modulation method detected in the first and second communication lines.

10. A line control apparatus, comprising:

a band control unit that performs band control in accordance with a band setting value set based on a total transmission band of a first communication line and a second communication line after a change of a modulation method when the change of a modulation method of at least one of a first communication line and a second communication line is detected; and a transmitting unit that transmits data output from the band control unit to a first transmission apparatus and a second transmission apparatus, the first transmission apparatus being configured to terminate the first communication line, the second transmission apparatus being configured to terminate the second communication line.

11. The line control apparatus according to claim 10, wherein the band control unit aggregates the first and second transmission apparatuses to carry out the band control.

12. The line control apparatus according to claim 10, wherein the band control unit executes the band control using the change of the modulation method detected in the first and second communication lines.

13. A data output control method, comprising:

performing band control in accordance with a band setting value set based on a total transmission band of a first communication line and a second communication line after a change of a modulation method when the change of a modulation method of at least one of a first communication lines and a second communication line is detected; and transmitting data performed band control to a first transmission apparatus and a second transmission apparatus, the first transmission apparatus being configured to terminate the first communication line, the second transmission apparatus being configured to terminate the second communication line.

14. The data output control method according to claim 13, wherein said performing the band control includes aggregating the first and second transmission apparatuses to carry out the band control.

15. The data output control method according to claim 13, wherein said performing the band control includes using the change of the modulation method detected in the first and second communication lines.

* * * * *